(12) United States Patent
Lahoda et al.

(10) Patent No.: US 12,525,368 B2
(45) Date of Patent: Jan. 13, 2026

(54) METHOD OF FORMING A UNITARY NUCLEAR FUEL SEGMENT BY HEAT BONDING A THERMALLY CONDUCTIVE LAYER DEPOSITED ON A FIRST FUEL LAYER TO A THERMALLY CONDUCTIVE LAYER DEPOSITED ON A SECOND FUEL LAYER

(71) Applicant: Westinghouse Electric Company LLC, Cranberry Township, PA (US)

(72) Inventors: Edward J. Lahoda, Edgewood, PA (US); Clinton B. Armstrong, Slippery Rock, PA (US); Lyman J. Petrosky, Latrobe, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 617 days.

(21) Appl. No.: 17/758,443

(22) PCT Filed: Jan. 8, 2021

(86) PCT No.: PCT/US2021/012642
§ 371 (c)(1),
(2) Date: Jul. 6, 2022

(87) PCT Pub. No.: WO2021/142220
PCT Pub. Date: Jul. 15, 2021

(65) Prior Publication Data
US 2023/0036331 A1 Feb. 2, 2023

Related U.S. Application Data

(60) Provisional application No. 62/958,964, filed on Jan. 9, 2020.

(51) Int. Cl.
*G21C 21/02* (2006.01)
*G21C 3/18* (2006.01)
(Continued)

(52) U.S. Cl.
CPC ............... *G21C 21/02* (2013.01); *G21C 3/18* (2013.01); *G21C 3/20* (2013.01); *G21C 3/36* (2013.01); *G21C 7/04* (2013.01)

(58) Field of Classification Search
CPC . G21C 21/02; G21C 3/18; G21C 3/20; G21C 3/36; G21C 7/04
(Continued)

(56) References Cited

U.S. PATENT DOCUMENTS 3,427,222 A 2/1969 Biancheria et al.
4,818,477 A 4/1989 Chubb
(Continued)

FOREIGN PATENT DOCUMENTS

JP S6135393 A 2/1986
JP H337717 A 2/1991
(Continued)

OTHER PUBLICATIONS

International Search Report and Written Opinion for International PCT Application No. PCT/US2021/012642, dated Jun. 25, 2021.
Office Action for corresponding Japanese Application No. 2022-542225, dated Nov. 7, 2023 (English Translation).

*Primary Examiner* — Jack W Keith
*Assistant Examiner* — Daniel Wasil
(74) *Attorney, Agent, or Firm* — K&L Gates LLP

(57) ABSTRACT

A method is disclosed. The method comprises depositing a thermally conductive layer onto at least a portion of at least one surface of a first nuclear fuel layer; depositing a thermally conductive layer onto at least a portion of at least one surface of a second nuclear fuel layer, wherein the second nuclear fuel layer is different from the first nuclear fuel layer; stacking the first nuclear fuel layer and the second nuclear fuel layer, wherein the thermally conductive layer of the first nuclear fuel layer abuts the thermally conductive layer of the second nuclear fuel layer; and bonding the (Continued)

thermally conductive layer of the first nuclear fuel layer to the thermally conductive layer of the second nuclear fuel layer to form a unitary nuclear fuel segment comprising the first nuclear fuel layer and the second nuclear fuel layer.

9 Claims, 5 Drawing Sheets

(51) Int. Cl.
  *G21C 3/20* (2006.01)
  *G21C 3/36* (2006.01)
  *G21C 7/04* (2006.01)
(58) Field of Classification Search
  USPC .................................................. 376/261, 414
  See application file for complete search history.

(56) References Cited

U.S. PATENT DOCUMENTS

| 2019/0108920 | A1  | 4/2019  | Howe et al.   |          |
|--------------|-----|---------|---------------|----------|
| 2019/0139654 | A1  | 5/2019  | Lahoda et al. |          |
| 2021/0358645 | A1* | 11/2021 | Kim           | G21C 3/20 |
| 2023/0386686 | A1* | 11/2023 | Murakami      | G21C 3/36 |

FOREIGN PATENT DOCUMENTS

| JP | H368896 A     | 3/1991  |
| JP | H4283692 A    | 10/1992 |
| JP | H04-335188 A  | 11/1992 |
| WO | 2007059851 A1 | 5/2007  |
| WO | 2012047657 A2 | 4/2012  |
| WO | WO2019125604 A2 | 6/2019 |
| WO | 2021142220 A1 | 7/2021  |

* cited by examiner

METHOD OF FORMING A UNITARY NUCLEAR FUEL SEGMENT BY HEAT BONDING A THERMALLY CONDUCTIVE LAYER DEPOSITED ON A FIRST FUEL LAYER TO A THERMALLY CONDUCTIVE LAYER DEPOSITED ON A SECOND FUEL LAYER

CROSS-REFERENCE TO RELATED APPLICATIONS

This application is a U.S. National Stage Entry under 35 U.S.C. § 371 of International Patent Application No. PCT/US2021/012642, entitled A NUCLEAR FUEL ASSEMBLY AND A METHOD OF MANUFACTURE THEREOF, filed Jan. 8, 2021, which claims benefit under 35 U.S.C. § 119(e) to U.S. Provisional Patent Application No. 62/958,964, which was filed on Jan. 9, 2020. The entire disclosures of which are hereby incorporated by reference herein.

GOVERNMENT SUPPORT

This invention was made with government support under Government Contract No. NE-0008824 awarded by the Department of Energy. The government has certain rights in the invention.

BACKGROUND

Nuclear fuel, such as, for example, uranium dioxide, can be manufactured into nuclear fuel pellets. The nuclear fuel pellets loaded into fuel rods for use in a pressurized water reactor. There are challenges with the manufacture of nuclear fuel pellets, loading of nuclear fuel pellets into fuel rods, and operation of the fuel rods in a pressurized water reactor.

SUMMARY

The present disclosure provides a method for manufacture of a nuclear fuel assembly. The method comprises depositing a thermally conductive layer onto at least a portion of at least two nuclear fuel layers to create at least two at least partially coated layers. The method comprises stacking the at least two coated layers and bonding the at least two coated layers to form a nuclear fuel assembly.

The present disclosure also provides a nuclear fuel assembly comprising a stack of at least two at least partially coated layers bonded together. Each coated layer comprises a nuclear fuel layer and a thermally conductive layer disposed on at least a portion of the nuclear fuel layer.

It is understood that the inventions described in this specification are not limited to the examples summarized in this Summary. Various other aspects are described and exemplified herein.

BRIEF DESCRIPTION OF THE DRAWING

The features and advantages of the examples, and the manner of attaining them, will become more apparent, and the examples will be better understood by reference to the following description of examples taken in conjunction with the accompanying drawing, wherein.

Corresponding reference characters indicate corresponding parts throughout the several views. The exemplifications set out herein illustrate certain examples, in one form, and such exemplifications are not to be construed as limiting the scope of the examples in any manner.

DETAILED DESCRIPTION

Figure 1:
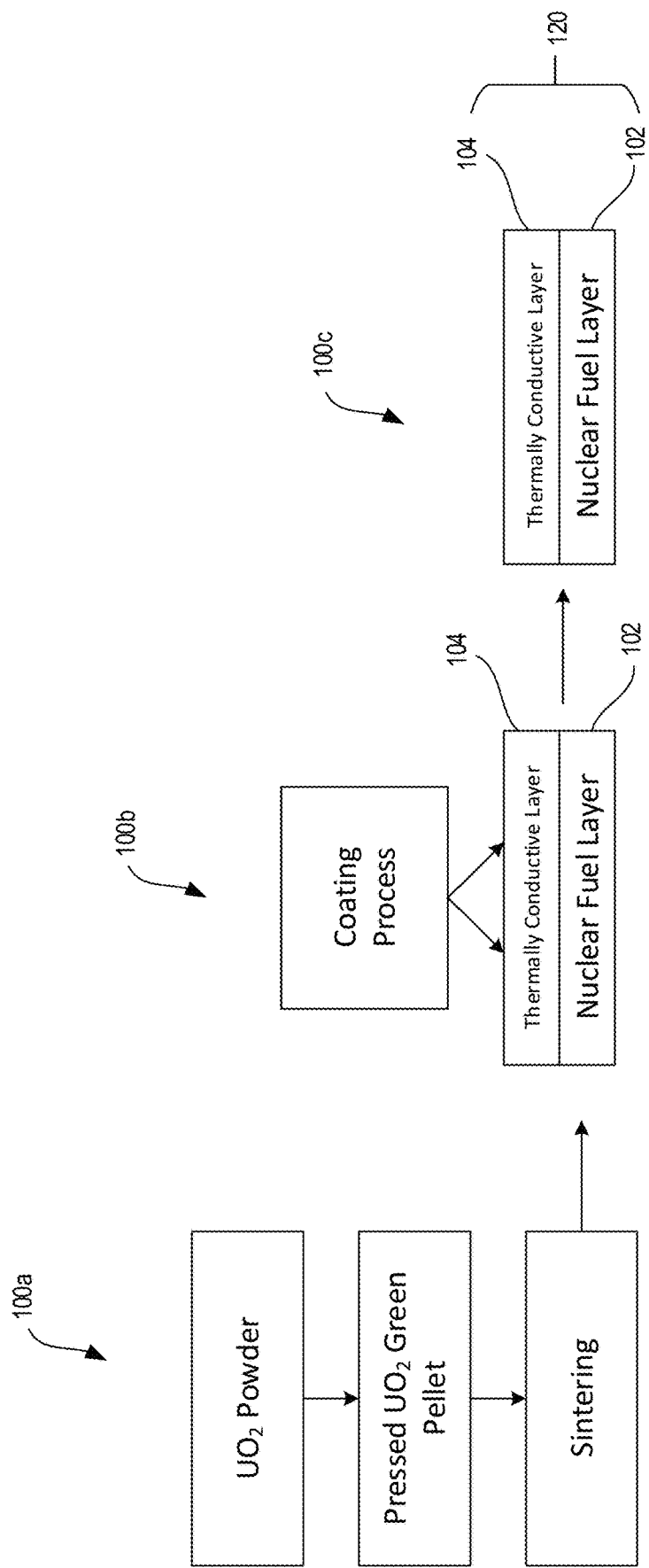
FIG. 1 is a schematic process diagram illustrating a method of manufacture of a coated layer according to the present disclosure.

Certain exemplary aspects of the present disclosure will now be described to provide an overall understanding of the principles of the composition, function, manufacture, and use of the compositions and methods disclosed herein. An example or examples of these aspects are illustrated in the accompanying drawing. Those of ordinary skill in the art will understand that the compositions, articles, and methods specifically described herein and illustrated in the accompanying drawing are non-limiting exemplary aspects and that the scope of the various examples of the present invention is defined solely by the claims. The features illustrated or described in connection with one exemplary aspect may be combined with the features of other aspects. Such modifications and variations are intended to be included within the scope of the present invention.

Reference throughout the specification to "various examples," "some examples," "one example," "an example," or the like, means that a particular feature, structure, or characteristic described in connection with the example is included in an example. Thus, appearances of the phrases "in various examples," "in some examples," "in one example," "in an example," or the like, in places throughout the specification are not necessarily all referring to the same example. Furthermore, the particular features, structures, or characteristics may be combined in any suitable manner in an example or examples. Thus, the particular features, structures, or characteristics illustrated or described in connection with one example may be combined, in whole or in part, with the features, structures, or characteristics of another example or other examples without limitation. Such modifications and variations are intended to be included within the scope of the present examples.

As used in this specification, particularly in connection with coating layers or films, the terms "on," "onto," "over," and variants thereof (e.g., "applied over," "formed over," "deposited over," "provided over," "located over," and the like) mean applied, formed, deposited, provided, or otherwise located over a surface of a substrate but not necessarily in contact with the surface of the substrate. For example, a coating layer "applied over" a substrate does not preclude the presence of another coating layer or other coating layers of the same or different composition located between the applied coating layer and the substrate. Likewise, a second coating layer "applied over" a first coating layer does not preclude the presence of another coating layer or other coating layers of the same or different composition located between the applied second coating layer and the applied first coating layer.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

Nuclear fuel, such as, for example, uranium dioxide, can have a very low thermal conductivity that can present issues for normal operation and for design basis accidents. It has been proposed to utilize molybdenum inserts in an effort to reduce nuclear fuel temperature. See, for example, Pavel G. Medvedev, Robert D. Mariani, "Conductive inserts to reduce nuclear fuel temperature" and T. Tverberg, "The High Burn-Up Disk Irradiation Test, Ifa-655: Final Report on the In-Pile Performance," OECD Halden Reactor Project report F6.5 HWR-837, April 2008. However, manufacturing nuclear fuel pellets comprising molybdenum inserts and loading the fuel pellet into a fuel rod faces various challenges. For example, positioning the molybdenum inserts between uranium oxide wafers to create an interlayered fuel pellet may not be practical. Further, molybdenum has a thermal neutron absorption cross-section of 2.51 b (S. F. Mughabghab, "Thermal Neutron Capture Cross Sections Resonance Integrals and G-Factors," International Atomic Energy Agency INDC(NDS)-440, Distr. PG+R, February, 2003). Accordingly, molybdenum can absorb neutrons without fissioning. As such, the high thermal neutron cross-section may increase the enrichment needed in the nuclear fuel and therefore its cost. Furthermore, fuel pellets are often coated with integral fuel burnable absorbers (IFBA), which may need to be applied on the outside of the fuel pellet. It is likely that the molybdenum inserts will disrupt or break up the IFBA coating. Additionally, the interlayered fuel pellets may likely not to survive the coating process, which is carried out at high temperatures. In light of these issues, a nuclear fuel assembly and a method of manufacture are provided, which can enable efficient manufacturing of the nuclear fuel assembly, loading of nuclear fuel pellets into fuel rods, and operation of the fuel rods in a pressurized water reactor.

FIG. 1 illustrates a method of manufacturing a coated layer that can be used for manufacturing a nuclear fuel assembly. The manufacture of the nuclear fuel layer 102 can occur in various manners. For Example, as illustrated at step 100a, nuclear fuel powder can be pressed to form a $UO_2$ green pellet. Thereafter, the $UO_2$ green pellet can be sintered to form the nuclear fuel layer 102 using hydrogen and an inert gas with additions of carbon dioxide and water to maintain the proper final stoichiometry after sintering. In various examples, the nuclear fuel layer 102 is a wafer.

The nuclear fuel layer 102 can comprise uranium, a uranium alloy, uranium compound, plutonium, a plutonium alloy, plutonium compound, thorium, a thorium alloy, thorium compound, or a combination thereof. The uranium, uranium alloy, or uranium compound can comprise uranium-238, uranium-235, uranium-234, or a combination thereof. The thorium, thorium alloy, or thorium compound can comprise thorium-232. The plutonium, plutonium alloy, or plutonium compound can comprise plutonium-239, plutonium-240, plutonium-241, plutonium-242, plutonium-244, or a combination thereof. In various examples, the nuclear fuel layer 102 comprises uranium oxide.

Additionally, the nuclear fuel layer 102 can comprise an additive, such as, for example, chromium (III) oxide, aluminum oxide, silicon dioxide, other additives, or combinations thereof. The additives may be no greater than 10% by weight of the nuclear fuel layer 102. The additions can improve grain size, fission gas release, and other properties of the nuclear fuel layer 102 as desired.

The nuclear fuel layer 102 can comprise an integrated fuel burnable absorber (IFBA). The IFBA can comprise a boride alloy, gadolinium, a gadolinium alloy, erbium, an erbium alloy, hafnium, a hafnium alloy, or a combination thereof. For example, the IFBA can comprise zirconium diboride, uranium diboride, uranium tetraboride, gadolinium, gadolinium oxide, erbium, erbium oxide, hafnium, hafnium oxide, boron containing glass (e.g., borosilicate glass), or a combination thereof. The IFBA can suppress excess reactivity near the beginning of a fuel cycle in a pressurized water reactor by absorbing neutrons and can absorb less neutrons over time as the IFBA is chemically transformed. In various examples, the nuclear fuel layer 102 can be disc shaped, or a polygon shaped (e.g., hexagon). The nuclear fuel layer 102 can be 1 millimeter to 15 millimeters thick.

A thermally conductive layer 104 can be deposited onto at least a portion of the nuclear fuel layer 102 to create a at least partially coated layer 120 with an increase thermal conductivity compared to the nuclear fuel layer 102 as shown at step 100b. For example, the thermally conductive layer 104 can comprise a thermal conductivity greater than a thermal conductivity of the nuclear fuel layer 102. In various examples, the thermally conductive layer 104 can be a sheet, foil, a coating, or a combination thereof.

The thermally conductive layer 104 can comprise titanium, a titanium alloy, molybdenum, a molybdenum alloy (e.g., TZM (Molybdenum 99.40 w/%, Zirconium 0.08 w/% and Titanium 0.5 w/%), tungsten, a tungsten alloy, zirconium, a zirconium alloy, beryllium, a beryllium alloy (e.g., beryllium oxide), chromium, a chromium alloy, a uranium boride (e.g., uranium diboride, uranium tetraboride), or a combination thereof. In various examples, the thermally conductive layer 104 can comprise zirconium which has a low thermal neutron cross-section of 0.185b, or a zirconium alloy, such as, for example, Zirlo (1% Sn, 1% Nb, 0.1% Fe, 0.125% O2 with the balance as Zr) since Zirlo also has a reduced thermal neutron cross-section. The reduced thermal neutron cross-section can result in the loss of fewer neutrons to parasitic reactions that do not result in fission. Therefore, a lower level in enrichment of the nuclear fuel layer 102 may be used and/or a higher efficiency nuclear fuel assembly can be produced therefrom.

The thermally conductive layer 102 can comprise an IFBA. For example, where the thermally conductive layer 102 comprises zirconium or a zirconium alloy, the thermally conductive layer can further comprise hafnium, a hafnium alloy, erbium, an erbium alloy, gadolinium, a gadolinium alloy, or a combination thereof. The thermally conductive layer 104 can comprises a range of 0.01% to 20% by total weight of the thermally conductive layer 104 hafnium, a hafnium alloy, erbium, an erbium alloy, gadolinium, a gadolinium alloy, or a combination thereof and the balance can be zirconium and incidental impurities. The thermally conductive layer 104 can comprise a range of 0.01% to 10% by total weight of the thermally conductive layer 104 hafnium, a hafnium alloy, erbium, an erbium alloy, gadolinium, a gadolinium alloy, or a combination thereof and the balance can be zirconium and incidental impurities. In examples where the thermally conductive layer 102 comprises zirconium or a zirconium alloy and hafnium, a hafnium alloy, erbium, an erbium alloy, gadolinium, a gadolinium alloy, or a combination thereof, the thermally conductive layer 102 can be an IFBA and act as a bonding agent between nuclear fuel layers due to a lower melting point (1852° C. to 2222° C.) of the thermally conductive layer 104 as compared to uranium dioxide (2865° C.).

In examples where the thermally conductive layer 104 comprises uranium diboride, the boron content of the uranium diboride can be at least 95% boron-11 by total moles of the boron content in the uranium diboride. Uranium diboride comprising boron-11 can be a thermally conductive layer, an IFBA, and act as a bonding agent between nuclear fuel layers due to its lower melting point (2430° C.) as compared to uranium dioxide (2865° C.). In certain examples, the thermally conductive layer 104 can comprise a mixture of uranium diboride and beryllium oxide. Beryllium oxide can lower the thermal neutron cross-section of the thermally conductive layer to a desired level.

Figure 2:
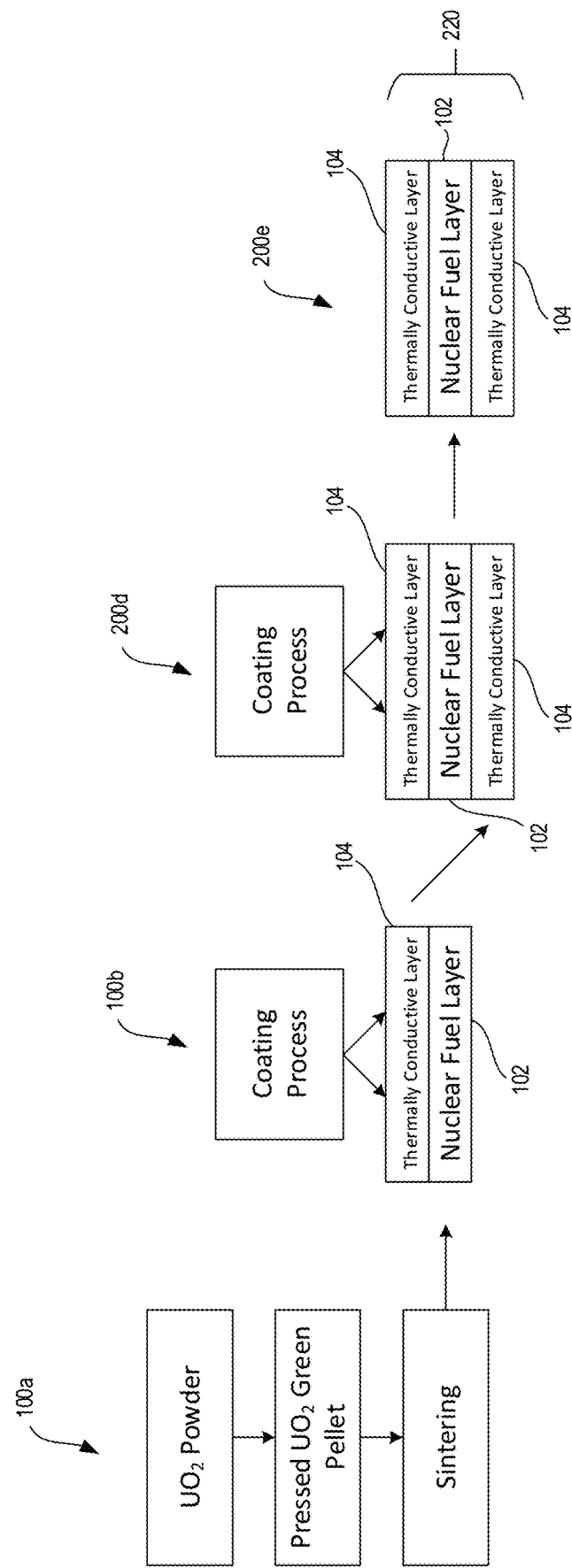
FIG. 2 is a schematic process diagram illustrating a method of manufacture of a coated layer according to the present disclosure.

The thermally conductive layer 102 can be deposited onto at least a portion of the nuclear fuel layer 102 by physical vapor deposition, spraying (e.g., hot spraying, cold spraying), mechanically joining (e.g., stamping, pressing), melting, or a combination thereof. The thermally conductive layer 102 can be deposited onto a at least a portion of a single side of the nuclear fuel layer 102 or at least a portion of at least two sides of the nuclear fuel layer 102. For example, as illustrated in FIG. 1, a thermally conductive layer can be deposited at step 100b and thereafter cured/coalesced at step 100c in order to operatively couple the thermally conductive layer 104 to the nuclear fuel layer 102. As illustrated in FIG. 2, optionally a second thermally conductive layer 104 can be deposited onto at least a portion of a second side of the nuclear fuel layer 102 as illustrated in steps 200d and cured/coalesced at step 200e. The first thermally conductive layer 104 and the second thermally conductive layer can be the same or different.

Deposition by physical vapor deposition or spraying can comprise arranging the nuclear fuel layer 102 on a belt or other conveyance device and transporting the nuclear fuel layer 102 through a coater to deposit the thermally conductive layer 104 onto at least a portion of a first side of the nuclear fuel layer 102 and optionally curing/solidifying the thermally conductive layer 104. In various examples, as illustrated in FIG. 2, the nuclear fuel layer 102 with a single thermally conductive layer 104 can be flipped and a second thermally conductive layer 104 can be deposited onto at least a portion of a second side of the nuclear fuel layer 102 to form a coated layer 220. In various examples, beryllium oxide or uranium diboride can be applied by spraying. In examples comprising spraying, the particle size of the spray can be in a range from 0.1 to 30 microns. The spray can be applied using a gas, such as, for example, helium, neon, nitrogen, or a combination thereof, under high pressure through a spray nozzle with a solid material suspended/entrained in the gas after passing through the spray nozzle.

In various examples, physical vapor deposition coating targets or powders used for spraying can be an alloy containing zirconium and boron, hafnium, erbium, gadolinium, or a combination thereof. Beryllium can be added to the alloy to achieve the desired level of neutron absorption. The powders can be a mixture of a thermally conductive layer 104 and IFBA particles. A coating thickness in a range of 5 microns to 200 microns can be applied to the nuclear fuel layer 102, such as, for example a coating thickness in a range of 20 microns to 100 microns. In various examples, an IFBA layer can be applied separately onto the thermally conductive layer 104 or nuclear fuel layer 102. The IFBA layer can be intermediate to the conductive layer 104 and a nuclear fuel layer 102, on a different side of the nuclear fuel layer 102 than the conductive layer 104, or on a different side of the thermally conductive layer 104 than the nuclear fuel layer 102.

Deposition by mechanical joining can comprise mechanical pressing and/or stamping of the thermally conductive layer 104 onto the nuclear fuel layer 102. For example, the thermally conductive layer 102 can be in the form of a foil or sheet and the thermally conductive layer 102 can be pressed onto a surface of the nuclear fuel layer 102 and optionally bent over the edges of the nuclear fuel layer 102 to form a mechanical joint.

Deposition by melting can comprise heating the thermally conductive layer 104 to at least the melting point of the thermally conductive layer 104 and bonding it to the nuclear fuel layer 102. For example, melting of the thermally conductive layer 104 can occur in a controlled atmosphere furnace or through application of a voltage across the stacked coated layers in a range of 1 to 1000 volts/cm to provide bonding through melting of the thermally conductive layer 104. Inductive heaters for example can also be used to selectively heat the thermally conductive layer 104 or the IFBA layer that are electrically conductive. Microwave heating may also be used to heat either the nuclear fuel layer 102, the thermally conductive layer 104, or the IFBA layer.

At least two coated layers (e.g., 120, 220, or a combination thereof) can be stacked to form a stack comprising thermally conductive layers 104 interlayered between nuclear fuel layers 102. The stack can comprise a length, l, which can be in a range of 5 millimeters to 100 centimeters, such as, for example, 1 centimeter to 3 centimeters.

Thereafter, the coated layers in the stack can be bonded to form a nuclear fuel assembly. Bonding can comprise diffusion bonding, sintering (e.g., flash sintering, spark plasma sintering), welding (e.g., spot welding), brazing, melting, or a combination thereof. Bonding can utilize a variety of heating means, such as, for example, microwave heating, inductively coupled heating, or a combination thereof. The nuclear fuel assembly can be easier to place in a fuel rod than separate layers of nuclear fuel and metal. For example, the nuclear fuel assembly may reduce the chance of flipping during insertion into the fuel rod.

Figure 3:
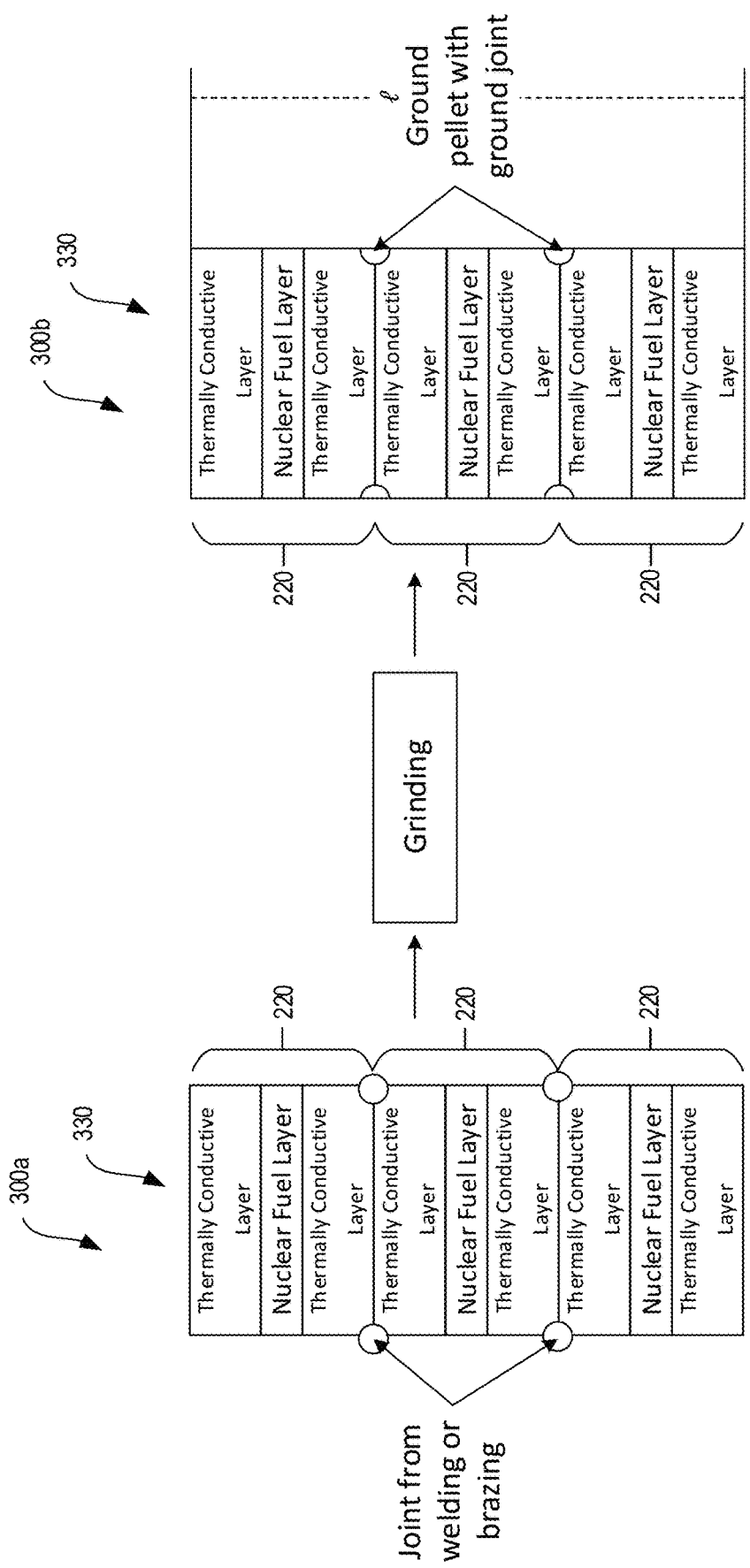
FIG. 3 is a schematic diagram illustrating a nuclear fuel assembly manufactured by welding and/or brazing according to the present disclosure.

As illustrated in FIG. 3, the coated layers 220 can be stacked and welded and/or brazed, to from a nuclear fuel assembly 330 at step 300a. Thereafter, in various examples, the nuclear fuel assembly 330 can be ground to a desired tolerance at step 300b. The nuclear fuel assembly 330 can be loaded into a fuel rod.

Figure 4:
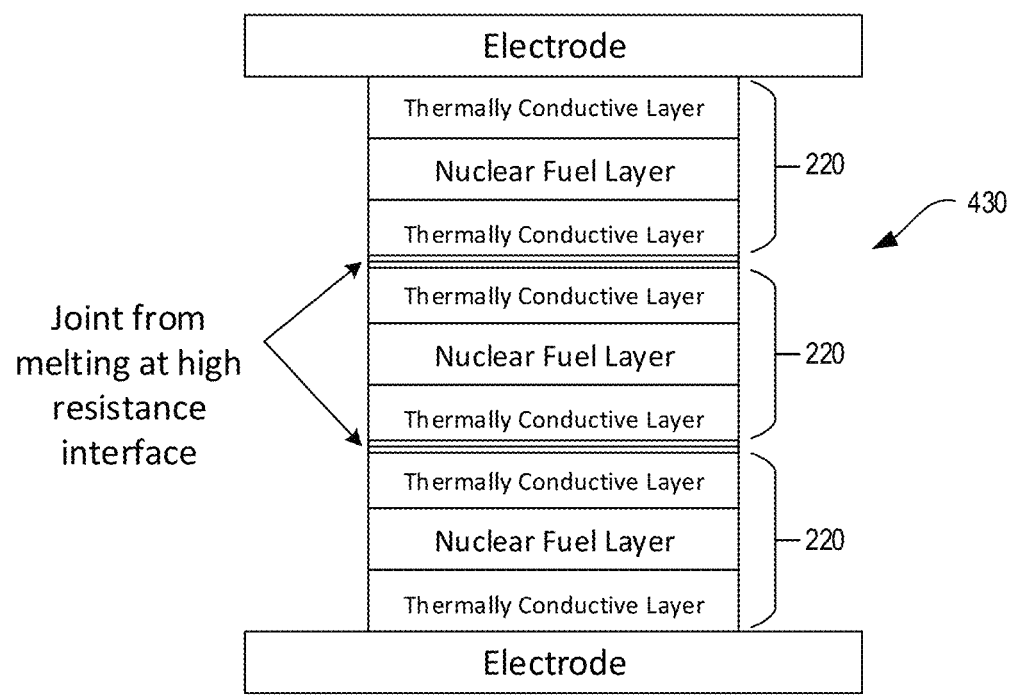
FIG. 4 is a schematic diagram illustrating a nuclear fuel assembly manufactured by flash sintering according to the present disclosure.
Figure 5:
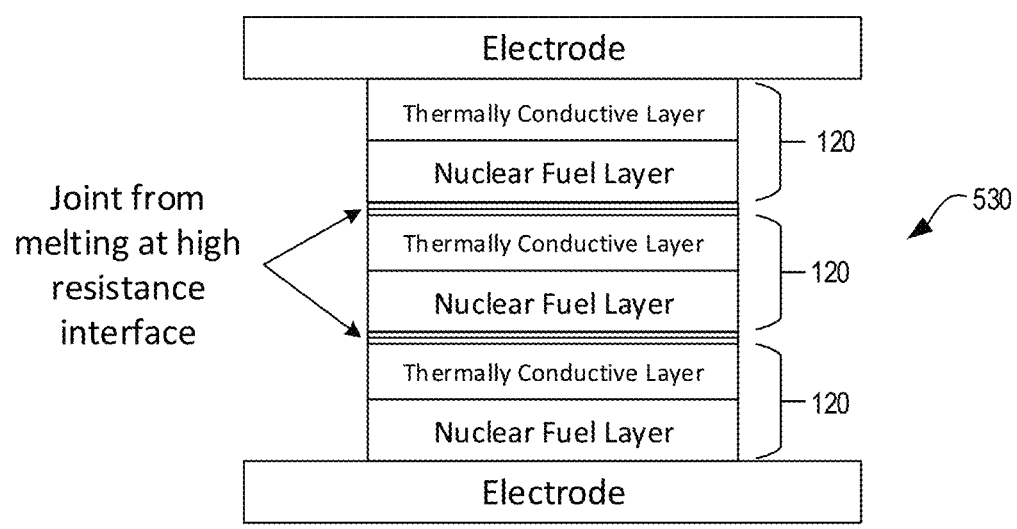
FIG. 5 is a schematic diagram illustrating a nuclear fuel assembly manufactured by flash sintering according to the present disclosure.

An example of flash sintering is provided in Alicia M. Raftery, Joao Gustavo Pereira da Silva, Darrin D. Byler, David A. Andersson, Blas P. Uberuaga, Christopher R. Stanek, Kenneth J. McClellan, "Onset conditions for flash sintering of $UO_2$," Journal of Nuclear Materials 493 (2017), pages 264-270 which is hereby incorporated by reference in its entirety. Flash sintering can comprise applying a high voltage (e.g., 120 V/cm) across the stacked coated layers until high thermal conductivity surfaces on the pellets are fused as illustrated in FIG. 4. For example, a slight gap at the interfaces of the coated layers can create a high resistance hot spot that can cause the thermally conductive layers to locally melt. Similar to FIG. 4, as illustrated in FIG. 5, coated layers 120 can be stacked and bonded together to form nuclear fuel assembly 530. In various examples, the nuclear fuel assemblies 430 and 530 can be ground to a desired tolerance and then loaded into a fuel rod.

In certain examples, a stack of coated layers can be subjected to a pressure in a range of 1 kilopascal to 100 megapascals and a temperature up to the melting point of the thermally conductive layer 104 to diffusion bond the thermally conductive layer 104 to another thermally conductive layer 104 or the nuclear fuel layer 102.

The nuclear fuel assembly can be a fuel pellet. The nuclear fuel assembly can be an interlayered metal nuclear fuel assembly. The nuclear fuel assembly can comprise a cylindrical, an annular, a polygonal, or a particle shape.

Various aspects of the invention include, but are not limited to, the aspects listed in the following numbered clauses.

1. A method comprising: depositing a thermally conductive layer onto at least a portion of at least two nuclear fuel layers to create at least two at least partially coated layers; stacking the at least two coated layers; and bonding the at least two coated layers to form a nuclear fuel assembly.

2. The method of clause 1, wherein depositing the thermally conductive layer comprises physical vapor deposition, spraying, mechanically joining, melting, or a combination thereof.

3. The method of any one of clauses 1-2, wherein depositing the thermally conductive layer comprises depositing a first thermally conductive layer onto at least a portion of a first side of a nuclear fuel layer and a second thermally conductive layer onto at least a portion of a second side of the nuclear fuel layer.

4. The method of any one of clauses 1-3, wherein bonding the at least two coated layers comprises diffusion bonding, sintering, welding, brazing, melting, or a combination thereof.

5. The method of clause 4, wherein melting comprises microwave heating, inductively coupled heating, or a combination thereof.

6. The method of any one of clauses 1-5, wherein the thermally conductive layer comprises titanium, a titanium alloy, molybdenum, a molybdenum alloy, tungsten, a tungsten alloy, zirconium, a zirconium alloy, beryllium, a beryllium alloy, chromium, a chromium alloy, a uranium boride, or a combination thereof.

7. The method of any one of clauses 1-6, wherein the thermally conductive layer comprises zirconium.

8. The method of any one of clauses 1-7, wherein the thermally conductive layer comprises an integral fuel burnable absorber.

9. The method of any one of clauses 1-8, wherein the nuclear fuel layer comprises uranium, a uranium alloy, a uranium compound, plutonium, a plutonium alloy, plutonium compound, thorium, a thorium alloy, thorium compound, or a combination thereof.

10. A nuclear fuel assembly comprising: a stack of at least two at least partially coated layers bonded together, each coated layer comprising: a nuclear fuel layer; and a thermally conductive layer disposed on at least a portion of the nuclear fuel layer.

11. The nuclear fuel assembly of clause 10, wherein each coated layer comprises a first thermally conductive layer disposed on at least a portion of a first side of the nuclear fuel layer and a second thermally conductive layer disposed on at least a portion of a second side of the nuclear fuel layer.

12. The nuclear fuel assembly of any one of clauses 10-11, wherein the thermally conductive layer comprises titanium, a titanium alloy, molybdenum, a molybdenum alloy, tungsten, a tungsten alloy, zirconium, a zirconium alloy, beryllium, a beryllium alloy, chromium, a chromium alloy, a uranium boride, or a combination thereof.

13. The nuclear fuel assembly of any one of clauses 10-12, wherein the thermally conductive layer comprises zirconium or a zirconium alloy.

14. The nuclear fuel assembly of clause 13, wherein the thermally conductive layer further comprises hafnium, a hafnium alloy, erbium, an erbium alloy, gadolinium, a gadolinium alloy, or a combination thereof.

15. The nuclear fuel assembly of clause 14, wherein the thermally conductive layer comprises a range of 0.01% to 20%, by total weight of the thermally conductive layer, hafnium, a hafnium alloy, erbium, an erbium alloy, gadolinium, a gadolinium alloy, or a combination thereof.

16. The nuclear fuel assembly of any one of clause 10, wherein the thermally conductive layer comprises uranium diboride, wherein the boron content of the uranium diboride is at least 95% boron-11 by total weight of the boron content in the uranium diboride.

17. The nuclear fuel assembly of any one of clauses 10 and 16, wherein the thermally conductive layer comprises a mixture of uranium diboride and beryllium oxide.

18. The nuclear fuel assembly of any of clauses 10-17, wherein the thermally conductive layer comprises an integral fuel burnable absorber (IFBA).

19. The nuclear fuel assembly of clause 18, wherein the IFBA comprises a boride alloy, gadolinium, a gadolinium alloy, erbium, an erbium alloy, hafnium, a hafnium alloy, or a combination thereof.

20. The nuclear fuel assembly of clause 19, wherein the IFBA further comprises mixtures containing beryllium, beryllium oxide, or a combination thereof.

21. The nuclear fuel assembly of any one of clauses 10-20, wherein the nuclear fuel layer comprises uranium, a uranium alloy, uranium compound, plutonium, a plutonium alloy, plutonium compound, thorium, a thorium alloy, thorium compound, or a combination thereof.

Those skilled in the art will recognize that the herein described compositions, articles, methods, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting Various features and characteristics are described in this specification to provide an understanding of the composition, structure, production, function, and/or operation of the invention, which includes the disclosed compositions, coatings, and methods. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

With respect to the appended claims, those skilled in the art will appreciate that recited operations therein may generally be performed in any order. Also, although various operational flows are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a composition, nuclear fuel assembly, or method that "comprises," "has," "includes," or "contains" a feature or features and/or characteristics possesses the feature or those features and/or characteristics but is not limited to possessing only the feature or those features and/or characteristics. Likewise, an element of a composition, coating, or process that "comprises," "has," "includes," or "contains" the feature or features and/or characteristics possesses the feature or those features and/or characteristics but is not limited to possessing only the feature or those features and/or characteristics and may possess additional features and/or characteristics.

The grammatical articles "a," "an," and "the," as used in this specification, including the claims, are intended to include "at least one" or "one or more" unless otherwise indicated. Thus, the articles are used in this specification to refer to one or more than one (i.e., to "at least one") of the grammatical objects of the article. By way of example, "a component" means one or more components and, thus, possibly more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent, publication, or other document identified in this specification is incorporated by reference into this specification in its entirety unless otherwise indicated but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with the written description, sufficiency of description, and added matter requirements.

Whereas particular examples of this invention have been described above for purposes of illustration, it will be evident to those skilled in the art that numerous variations of the details of the present invention may be made without departing from the invention as defined in the appended claims.

What is claimed is:

1. A method comprising:
    depositing a thermally conductive layer onto at least a portion of at least one surface of a first nuclear fuel layer;
    depositing a thermally conductive layer onto at least a portion of at least one surface of a second nuclear fuel layer, wherein the second nuclear fuel layer is different from the first nuclear fuel layer;
    stacking the first nuclear fuel layer and the second nuclear fuel layer, wherein the thermally conductive layer of the first nuclear fuel layer abuts the thermally conductive layer of the second nuclear fuel layer; and
    heat bonding the thermally conductive layer of the first nuclear fuel layer to the thermally conductive layer of the second nuclear fuel layer to form a nuclear fuel segment comprising the first nuclear fuel layer and the second nuclear fuel layer.

2. The method of claim 1, wherein depositing the thermally conductive layers comprises physical vapor deposition, spraying, mechanically joining, melting, or a combination thereof.

3. The method of claim 1, further comprising:
    depositing a thermally conductive layer onto at least a portion of a second surface of the first nuclear fuel layer; and depositing a thermally conductive layer onto at least a portion of a second surface of the second nuclear fuel layer.

4. The method of claim 1, wherein bonding the thermally conductive layer of the first nuclear fuel layer to the thermally conductive layer of the second nuclear fuel layer comprises diffusion bonding, sintering, welding, brazing, melting, or a combination thereof.

5. The method of claim 4, wherein melting comprises microwave heating, inductively coupled heating, or a combination thereof.

6. The method of claim 1, wherein the thermally conductive layers comprise titanium, a titanium alloy, molybdenum, a molybdenum alloy, tungsten, a tungsten alloy, zirconium, a zirconium alloy, beryllium, a beryllium alloy, chromium, a chromium alloy, a uranium boride, or a combination thereof.

7. The method of claim 1, wherein the thermally conductive layers comprise zirconium.

8. The method of claim 1, wherein the thermally conductive layers comprise a boride alloy, gadolinium, a gadolinium alloy, erbium, an erbium alloy, hafnium, a hafnium alloy, or a combination thereof.

9. The method of claim 1, wherein the first nuclear fuel layer and the second nuclear fuel layer comprise uranium, a uranium alloy, a uranium compound, plutonium, a plutonium alloy, plutonium compound, thorium, a thorium alloy, thorium compound, or a combination thereof.

\* \* \* \* \*